(12) United States Patent
Passagot

(10) Patent No.: US 9,435,443 B2
(45) Date of Patent: Sep. 6, 2016

(54) THREE-PORT VALVE

(75) Inventor: Gerard Passagot, Vernon (FR)

(73) Assignee: SNECMA, Paris (FR)

( * ) Notice: Subject to any disclaimer, the term of this patent is extended or adjusted under 35 U.S.C. 154(b) by 72 days.

(21) Appl. No.: 14/000,087

(22) PCT Filed: Feb. 6, 2012

(86) PCT No.: PCT/FR2012/050246
§ 371 (c)(1),
(2), (4) Date: Aug. 16, 2013

(87) PCT Pub. No.: WO2012/110727
PCT Pub. Date: Aug. 23, 2012

(65) Prior Publication Data
US 2013/0327416 A1    Dec. 12, 2013

(30) Foreign Application Priority Data

Feb. 16, 2011 (FR) ..................................... 11 51261

(51) Int. Cl.
*F16K 11/02* (2006.01)
*F16K 11/048* (2006.01)
*F16K 11/056* (2006.01)

(52) U.S. Cl.
CPC ............ *F16K 11/022* (2013.01); *F16K 11/048* (2013.01); *F16K 11/056* (2013.01); *Y10T 137/0502* (2015.04); *Y10T 137/86879* (2015.04)

(58) Field of Classification Search
CPC .. F16K 11/022; F16K 11/048; F16K 11/056; F16K 27/0245; Y10T 137/86879; Y10T 137/86895; Y10T 137/0502
See application file for complete search history.

(56) References Cited

U.S. PATENT DOCUMENTS

| | | | | | |
|---|---|---|---|---|---|
| 4,674,540 | A | * | 6/1987 | Takei | ...................... B60T 8/364 |
| | | | | | 137/625.65 |
| 5,730,509 | A | * | 3/1998 | Eith et al. | ................ 251/129.14 |
| 2010/0032036 | A1 | | 2/2010 | Quendt et al. | |

FOREIGN PATENT DOCUMENTS

| | | | |
|---|---|---|---|
| FR | 2 254 741 | 7/1975 | |
| FR | 2 487 942 | 2/1982 | |
| GB | 2081848 A * | 2/1982 | .............. F16K 11/04 |

OTHER PUBLICATIONS

International Search Report Issued Mar. 30, 2012 in PCT/FR12/050246 Filed Feb. 6, 2012.

* cited by examiner

*Primary Examiner* — Michael R Reid

(74) *Attorney, Agent, or Firm* — Oblon, McClelland, Maier & Neustadt, L.L.P.

(57) ABSTRACT

A three-port valve including a casing and a movable element received in the casing. The casing includes a fluid inlet, first and second fluid outlets, a first fluid-flow passage between the fluid inlet and the first fluid outlet, and a second fluid-flow passage between the first and second fluid outlets. The movable element includes a rod, a first valve member fastened to a first end of the rod and configured to be received towards the rod in a first valve seat for closing the first fluid-flow passage, and a second valve member fastened to a second end of the rod and configured to be received towards the rod in a second valve seat of the casing for closing the second fluid-flow passage. The valve also includes at least one diaphragm spring supporting the movable element in a plane substantially perpendicular to a movement axis between first and second positions.

5 Claims, 3 Drawing Sheets

THREE-PORT VALVE

BACKGROUND OF THE INVENTION

1. Field of the Invention

The present invention relates to three-port valves, and in particular to a three-port valve having a fluid inlet and first and second fluid outlets.

2. Description of the Related Art

Three-port valves are devices that make it possible to control the flow of a fluid, which may be a liquid or a gas, and they are used in a wide variety of fluid flow systems. Among systems that make use of three-port valves, there can be found, for example, the attitude and roll control systems for space vehicles, launchers, or rockets, in which said three-port valves are used for controlling the flow of gas to propulsive nozzles, or to systems for feeding propellant to propulsive thrusters of such vehicles.

Thus, in attitude and roll control systems for stages of the Ariane 5 launcher, a three-port valve is known that comprises a casing having a fluid inlet and first and second fluid outlets, together with an element that is movable in the casing. In that three-port valve, the movable element comprises a rod, a first valve member fastened to a first end of the rod, and a second valve member fastened to a second end of the rod. The first valve member is suitable for being received, towards the rod, in a first valve seat in order to close a first fluid-flow passage between the fluid inlet and the first fluid outlet, and the second valve member is suitable for being received, towards the rod, in a second valve seat in order to close a second passage between the first and second fluid outlets. The length of the rod allows the movable element to move between a first position in which the first passage is closed and the second passage is open, and a second position in which the first passage is open and the second passage is closed. Thus, in the first position, the inlet is shut off and pressure between the two outlets is equalized, whereas in the second position the valve enables fluid to flow from the inlet to the first outlet, while isolating the second outlet.

Such valves may be subjected to extreme levels of stress, in particular vibratory stress. A problem that can then arise is the valve members moving off-center relative to the corresponding valve seats, as a result of the rod moving radially or tilting relative to the casing. Such off-centering can lead to the valve members and/or the valve seats being damaged during movements of the movable element, and can also lead to the movements of the valve being slowed down or even jammed. Unfortunately, the ability to withstand vibratory environments and also the response speed and the reliability of a valve are fundamental factors in such applications.

In the prior art, attempts have been made to solve that problem by guiding the rod through a narrow bore in the casing. Unfortunately, that solution leads to a certain amount of friction and thus likewise to the valve being slowed down and running the risk of jamming.

BRIEF SUMMARY OF THE INVENTION

The invention seeks to propose a novel three-port valve that is capable of switching between two positions with a high degree of reliability and with friction that is zero or negligible.

In at least one embodiment of the present invention, this object is achieved by the fact that the valve also includes at least one diaphragm spring supporting the movable element in a plane substantially perpendicular to a movement axis between the first and second positions. Since such a diaphragm spring presents stiffness in its own plane that is much greater than the stiffness it presents on an axis perpendicular to its own plane, it thus enables the centering of the movable element to be maintained with friction that is nearly zero.

Advantageously, this three-port valve includes a first diaphragm spring supporting a first end of the movable element and a second diaphragm spring supporting a second end of the movable element. This ensures not only that the movable element is centered overall, but also that each of the two valve members is centered individually, and thus that the movable element remains in alignment on its movement axis.

Advantageously, the valve also includes an actuator for moving said movable element, e.g. such as an electromagnetic actuator or a fluid-driven actuator. It is thus possible to control the valve by means of such an actuator.

Advantageously, the valve also includes a return spring for urging the movable element towards the first position. Thus, without any contrary actuation of the movable element, it returns automatically towards the first position, thereby shutting off the valve inlet. Alternatively, at least one diaphragm spring may be prestressed in order to urge the movable element towards the first position. The diaphragm spring can thus perform the return spring function.

The invention also provides a fluid flow control device comprising a first three-port valve of the invention that is under electromagnetic control and a second three-port valve of the invention that is controlled by fluid flow, the fluid-driven actuator of the second three-port valve being connected to the first fluid outlet of the first three-port valve. Thus, the first valve acts as a pilot valve for the second valve, thus enabling large fluid flows to be controlled indirectly with an electromagnetic actuator of small capacity.

The invention also provides an attitude and/or roll control device, in particular for a space vehicle or rocket, that includes a propulsive fluid circuit of the invention. The term "propulsive fluid" is used to mean either a propulsive gas that is expelled directly by a nozzle downstream from the valve, or else a propellant designed to feed a propulsive chamber with at least one propellant.

The present invention also provides a method of assembling a three-port valve of the invention, in which the mounting of said at least one diaphragm spring is performed while said movable element is in said first or second position. In this way, the mounting is terminated when one of the valve members is received in a centered position in the corresponding valve seat, thereby ensuring that the diaphragm spring is centered by centering the diaphragm spring on the valve member. In particular, when the three-port valve includes a first diaphragm spring supporting a first end of the movable element, and a second diaphragm spring supporting a second end of the movable element, the mounting of the first diaphragm spring is advantageously performed while said movable element is in said first position, and the mounting of the second diaphragm spring is advantageously performed with said movable element is in said second position. This ensures that both diaphragm springs are centered individually.

BRIEF DESCRIPTION OF THE SEVERAL VIEWS OF THE DRAWINGS

The invention can be well understood and its advantages appear better on reading the following detailed description of an embodiment given by way of non-limiting example. The description refers to the accompanying drawings, in which.

DETAILED DESCRIPTION OF THE INVENTION

Figure 1A:
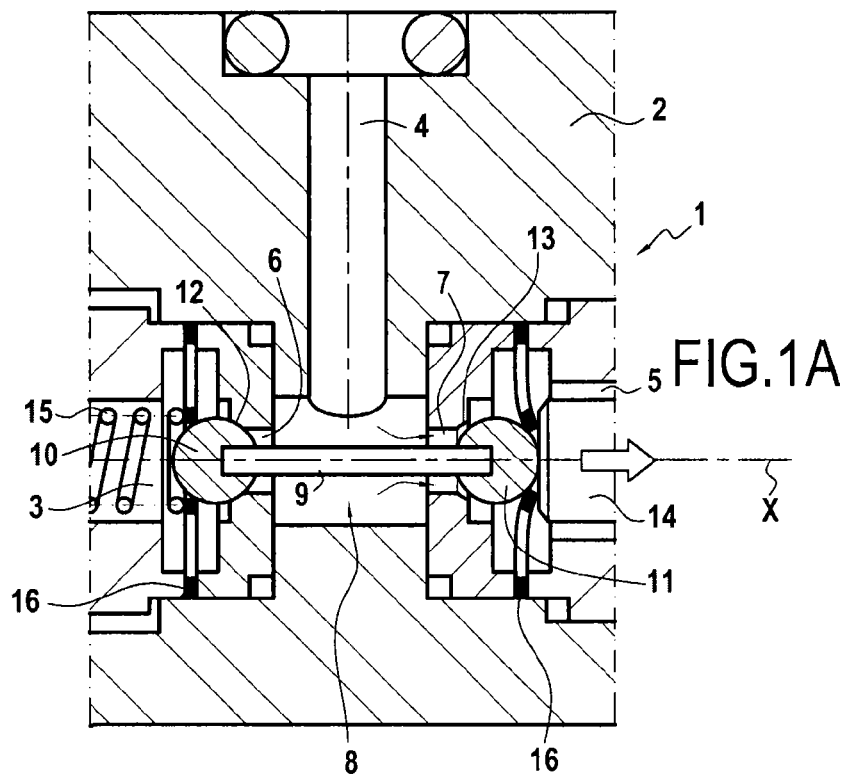
FIG. 1A is a longitudinal section of an electromagnetically-controlled three-port valve in a first embodiment of the invention, shown in a first position.
Figure 1B:
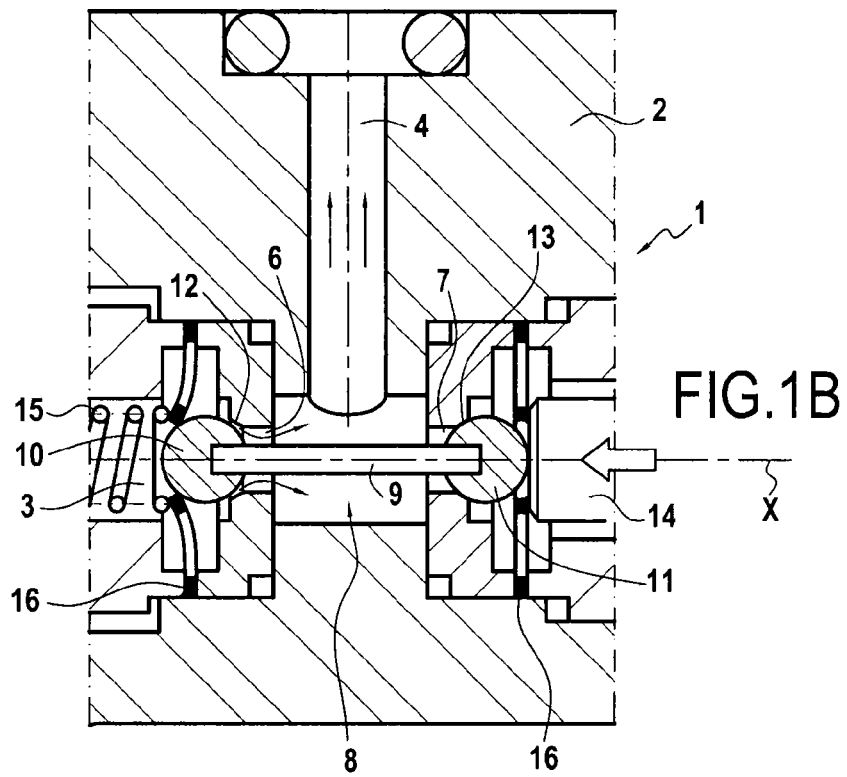
FIG. 1B is a longitudinal section of the FIG. 1A valve in a second position.

A three-port valve 1 in a first embodiment of the invention is shown in FIGS. 1A and 1B. The valve 1 has a casing 2 with a fluid inlet 3, a first fluid outlet 4, and a second fluid outlet 5. A first fluid-flow passage 6 connects the inlet 3 to the first outlet 4, and a second fluid-flow passage 7 connects the first outlet 4 to the second outlet 5. A movable element 8 is received in the casing 2. This movable element 8 comprises a rod 9 with respective valve members 10 and 11 at each end.

Although these two valve members 10 and 11 in the embodiment shown are spherical, the person skilled in the art can easily consider other alternative shapes depending on circumstances. In addition, although the rod 9 and the valve members 10 and 11 in the embodiment shown are constituted by distinct parts, the rod 9 could, alternatively, equally well be formed integrally with at least one of the valve members 10, 11.

The first valve member 10 is beside the fluid inlet 3, while the second valve member 11 is beside the second fluid outlet 5. The first fluid outlet 4 lies between the two valve members 10 and 11. Towards the rod 9, the first valve member 10 faces a first valve seat 12 that is pierced by the first fluid-flow passage 6, along which passage the rod 9 passes. Towards the rod 9, the second valve member 11 faces a second valve seat 13 that is pierced by the second fluid-flow passage 7, with the rod 9 also passing along that passage. The length of the rod 9 is such that the movable element 8 can move between a first position as shown in FIG. 1A, in which the first valve member 10 is received in the valve seat 12, thereby closing the first passage 6 and isolating the fluid inlet 3, and a second position, as shown in FIG. 1B, in which the second valve member 11 is received in the second valve seat 13, thereby closing the second passage 7 and isolating the second fluid outlet 5. In the first position, the second valve member 11 is offset from the seat 13, so the second passage 7 is open, thereby allowing the first outlet 7 to drain towards the second outlet 5, whereas in the second position, the first valve member 10 presents an offset relative to the seat 12 so the second passage 6 is thus open and allows the first outlet 4 to be fed from the inlet 3.

In order to actuate the movement of the movable element 8 between the first and second positions, the valve 1 also includes an electromagnetic actuator 14 and a spring 15. The spring 15 is a return spring urging the movable element 8 towards the first position, while the electromagnetic actuator 14, when activated, urges the movable element 8 in the opposite direction to the spring 15, towards the second position. Thus, the first position is the default position for the movable element 8, thereby automatically isolating the fluid inlet 3 in the event of the electromagnetic actuator 14 failing.

Figure 2:
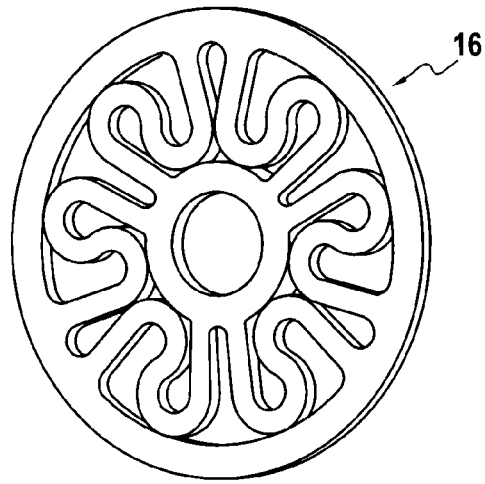
FIG. 2 is a face view of a diaphragm spring of the valve of FIGS. 1A and 1B.

In order to keep the two valve members 10 and 11 centered, each of the two members 10 and 11 is supported in the casing 2 by a flat diaphragm spring 16. Such a diaphragm spring 16 is shown in FIG. 2. The diaphragm spring 16 is substantially stiffer in its plane than along an axis perpendicular to its plane. By orienting it perpendicularly to the movement axis X of the movable element 8, it serves to hold the corresponding member 10, 11 radially in a centered position while enabling the valve members to move along the axis X with minimum resistance. The diaphragm spring 16 presents openings, and thus allows fluid to pass through its plane. At least one of the diaphragm springs 16 may optionally be prestressed towards the second position in order to urge the movable element towards the first position, thereby acting as the return spring 15.

Figure 3:
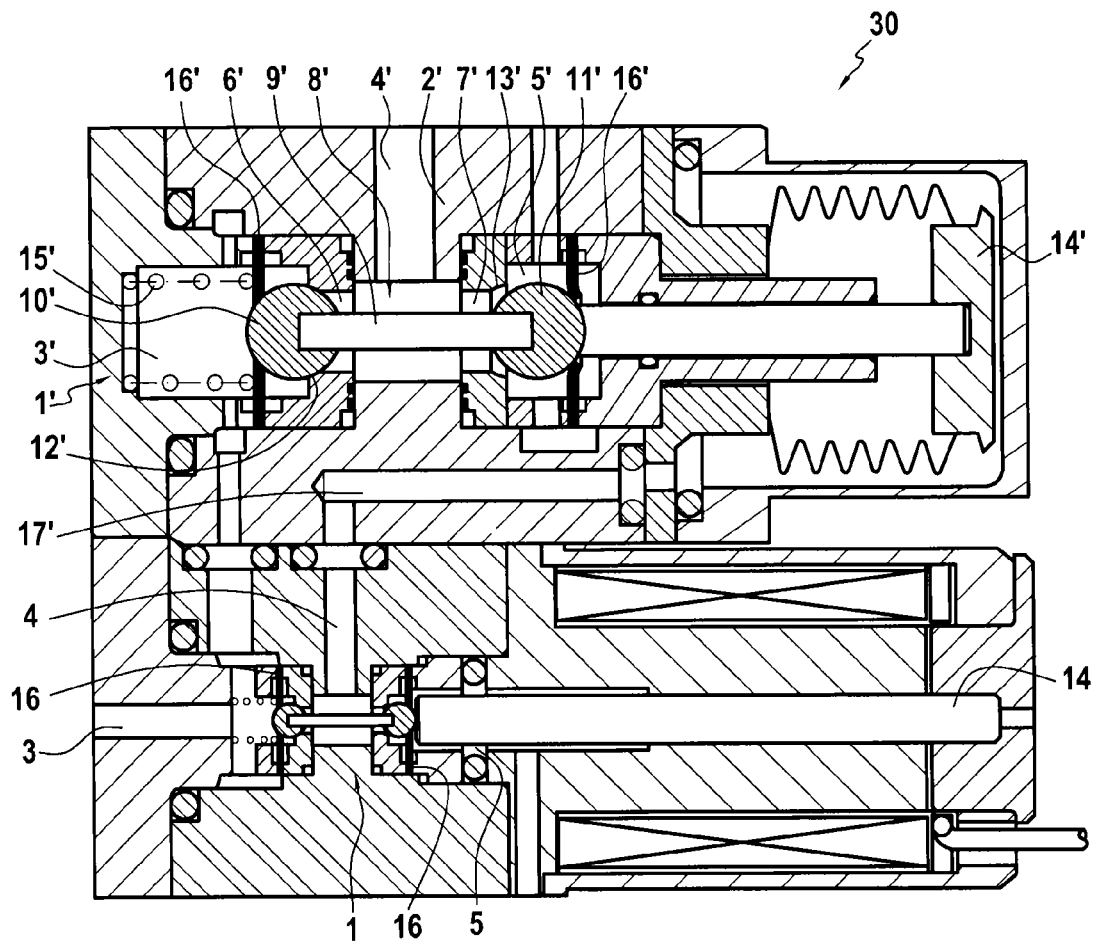
FIG. 3 is a longitudinal section of a fluid flow control device comprising a first three-port valve that is electrically controlled and in accordance with the first embodiment of the invention as shown in FIGS. 1A and 1B, together with a second three-port valve that is controlled by fluid flow and that is in accordance with a second embodiment of the invention.

Although in the first embodiment shown in FIGS. 1A and 1B the actuator is electromagnetic, it is also possible to use other types of actuator, such as for example fluid-driven actuators. Thus, FIG. 3 shows a fluid flow control device 30 having one three-port valve 1' in a second embodiment, having a fluid-driven actuator 14' connected for control purposes to a pilot three-port valve 1 that has an electromagnetic actuator in accordance with the first embodiment of the invention. Thus, the three-port valve 1' under fluid-flow control may present significantly greater capacity than the electromagnetically-controlled three-port valve 1 and may thus serve as an amplifier for the fluid signal from the pilot valve 1.

Like the electromagnetically-controlled three-port valve 1 of the first embodiment of the invention, the three-port valve 1' under fluid-flow control comprises a casing 2' with a fluid inlet 3', a first fluid outlet 4', and a second fluid outlet 5'. A first fluid-flow passage 6' connects the inlet 3' to the first outlet 4', and a second fluid-flow passage 7' connects the first outlet 4' to the second outlet 5'. A movable element 8' is received in the casing 2'. This movable element 8' comprises a rod 9' with two valve members 10' and 11' at respective ends thereof. Shapes other than the spherical shapes shown may also be considered for these valve members 10', 11'.

The first valve member 10' is beside the fluid inlet 3', while the second valve member 11' is beside the second fluid outlet 5'. The first fluid outlet 4' lies between the two valve members 10' and 11'. Towards the rod 9', the first valve member 10' faces a first valve seat 12' that is pierced by the first fluid-flow passage 6', which passage has the rod 9' passing therethrough. Towards the rod 9', the second valve member 11' faces a second valve seat 13' pierced by the second fluid-flow passage 7', which passage likewise has the rod 9' passing therethrough. As in the first embodiment, the length of the rod 9' is such that the movable element 8 can move between a first position in which the first valve member 10' is received in the valve seat 12', thereby closing the first passage 6' and isolating the fluid inlet 3', and a second position in which the second valve member 11' is received in the second valve seat 13', thereby closing the second passage 7' and isolating the second fluid outlet 5'. In the first position, the second valve member 11' presents an offset relative to the seat 13', so that the second passage 7' is open, thereby allowing the first outlet 4' to drain towards the second outlet 5', while in the second position the first valve member 10' presents an offset relative to the seat 12', so the first passage 6' is open and allows the first outlet 4' to be fed by the inlet 3'.

As in the first embodiment, the three-port valve 1' has a return spring 15' urging it towards the first position, and diaphragm springs 16' serve to support and center the valve members 10' and 11' on the movement axis X' of the movable element 8'. However, the actuator 14' of this valve 1' is a fluid-driven actuator, made up of a bellows in connection with a control fluid inlet 17', instead of an electromagnetic actuator. In the device 30, the inlet 17' for controlling the fluid-flow actuator 14' of the three-port valve 1' under fluid-flow control is connected to the first outlet 4 of the electromagnetically-controlled three-port valve 1, which valve thus acts as a pilot valve for the three-port valve 1' under fluid-flow control. Thus, when the electromagnetic actuator 14 is activated, fluid under pressure coming from the fluid inlet 3 of the first three-port valve 1 is directed to its fluid outlet 4 and thus to the fluid inlet 17' for controlling the fluid-driven actuator 14' of the second valve 1', thereby moving the movable element 8' from its first position to its second position, thus enabling fluid under pressure to pass from its inlet 3' to its first outlet 4'. If the electromagnetic actuator 14 is then deactivated, the fluid under pressure in the fluid-flow actuator 14' can be discharged via its control fluid inlet 17', the first outlet 4 of the first valve 1, and the second outlet 5 of the first valve 1. Thus, the return spring 15' of the second valve 1' can return the movable element 8' towards its first position, thereby closing the passage 6' between the inlet 3' and the first outlet 4' of the second valve 1' and opening the discharge passage 7' between the first outlet 4' and the second outlet 5' of the second valve F. The electromagnetic actuator 14 of the first valve 1 thus indirectly controls the second valve F. Like the diaphragm springs 16 of the first valve 1, the diaphragm springs 16' of the second valve 1' may also be prestressed so as to exert a return force on the movable element 8' towards the first position.

The fluid flow control device 30 may be integrated in an attitude and/or roll control system for a space vehicle or rocket. Under such circumstances, the second valve 1' serves to control the passage of a propellant fluid through its first outlet 4' towards a propulsive nozzle, if the propulsive fluid is a gas that is expelled directly by said nozzle, or to a propulsion chamber if the propulsive fluid is a propellant that is involved in an exothermal reaction in the propulsion chamber prior to being expelled by a nozzle from said propulsion chamber.

Figure 4C:
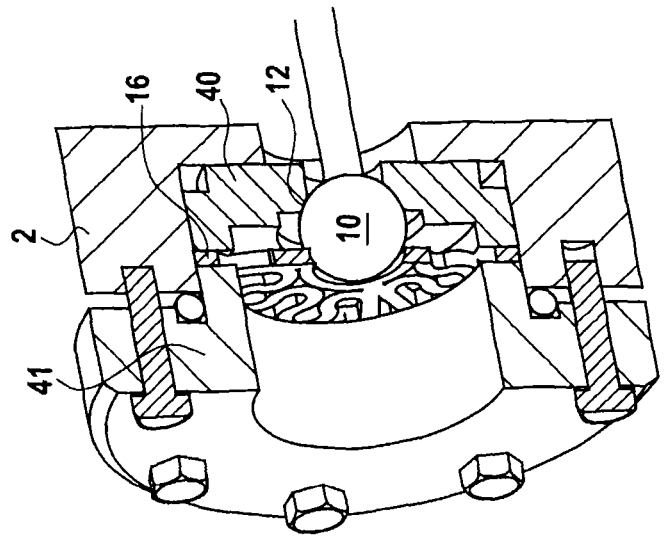
FIGS. 4A to 4C show how the valve of FIGS. 1A and 1B is assembled in part.
Figure 4B:
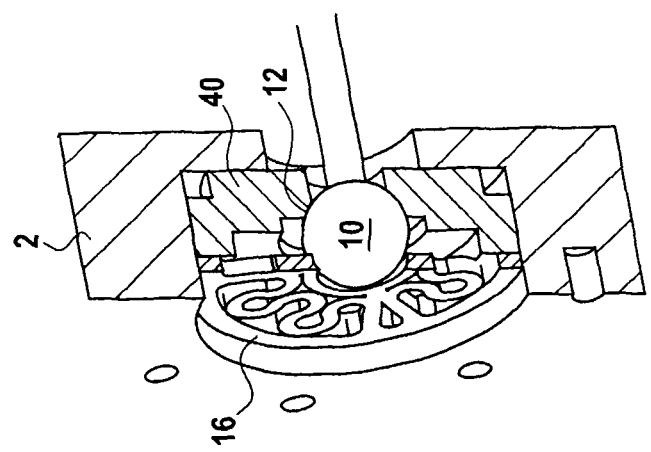
Figure 4A:
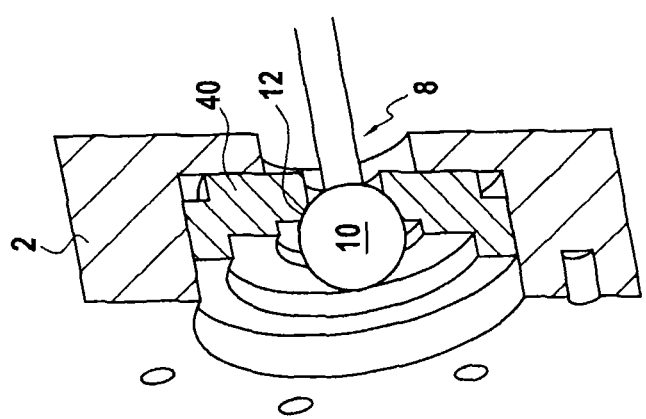

The way in which the diaphragm springs are installed is shown in FIGS. 4A to 4C for the example of assembling the first diaphragm spring 16 of the first valve member 10 of the first three-port valve 1. In FIG. 4A, it can be seen how the movable element 8 is put into the first position so as to sit the valve member 10 on the corresponding valve seat 12. With the valve member 10 naturally centered in this position, the diaphragm spring 16 is applied thereto, as shown in FIG. 4B. The diaphragm spring 16 is thus likewise centered, and it can then be fastened relative to the casing 2 by pinching it between two parts 40 and 41 that are fastened to said casing 2, the first part including the valve seat 12, as shown in FIG. 4C. The same method of assembling the diaphragm spring may also be used on each of the other diaphragm springs 16, 16', with the corresponding valve member 10, 11, 10', 11 being located on each occasion in its position received in its valve seat 12, 13, 12', 13'.

Although the present invention is described above with reference to specific embodiments, it is clear that various modifications and changes may be applied to those examples without going beyond the general scope of the invention as defined by the claims. For example, even though the three-port valve under fluid-flow control of the second embodiment of the invention is shown solely in combination with an electromagnetically-controlled three-port valve of the first embodiment of the invention, it could equally well be used independently thereof. Other types of actuator may also be used depending on circumstances. Consequently, the description and the drawings should be considered as being illustrative rather than restrictive.

The invention claimed is:

1. A method of assembling a three-port valve comprising:
   a casing including a fluid inlet, first and second fluid outlets, a first fluid-flow passage between the fluid inlet and the first fluid outlet, and a second fluid-flow passage between the first and second fluid outlets;
   a movable element received in the casing and comprising:
      a rod;
      a first valve member fastened to a first end of the rod and suitable for being received towards the rod in a first valve seat for closing the first fluid-flow passage; and
      a second valve member fastened to a second end of the rod and suitable for being received towards the rod in a second valve seat of the casing for closing the second fluid-flow passage, a length of the rod enabling the movable element to move between a first position in which the first passage is closed and the second passage is open, and a second position in which the first passage is open and the second passage is closed;
   a first diaphragm spring supporting the first valve member in a plane substantially perpendicular to a movement axis between the first and second positions, the first diaphragm spring centering the first valve member onto the first valve seat; and
   a second diaphragm spring supporting the second valve member in a plane substantially perpendicular to said movement axis, the second diaphragm spring centering the second valve member onto the second valve seat,
   wherein mounting of the first diaphragm spring is completed with the movable element in the first position, and mounting of the second diaphragm spring is completed with the movable element in the second position, the movable element being moved between the first and the second position between the mounting of the first diaphragm spring and the mounting of the second diaphragm spring.

2. The method of claim 1, wherein the three-port valve further comprises an actuator for moving the movable element.

3. The method of claim 2, wherein the actuator is an electromagnetic actuator.

4. The method of claim 2, wherein the actuator is a fluid-driven actuator.

5. The method of claim 1, wherein the three-port valve further comprises a return spring for returning the movable element towards the first position.

* * * * *